June 26, 1962 W. L. BOWMAN 3,040,609
BILLET SAW MEASURING DEVICE
Filed May 7, 1958 6 Sheets-Sheet 1

INVENTOR.
Wilbur L. Bowman
BY
Marzall, Johnston, Cook & Root
Attys.

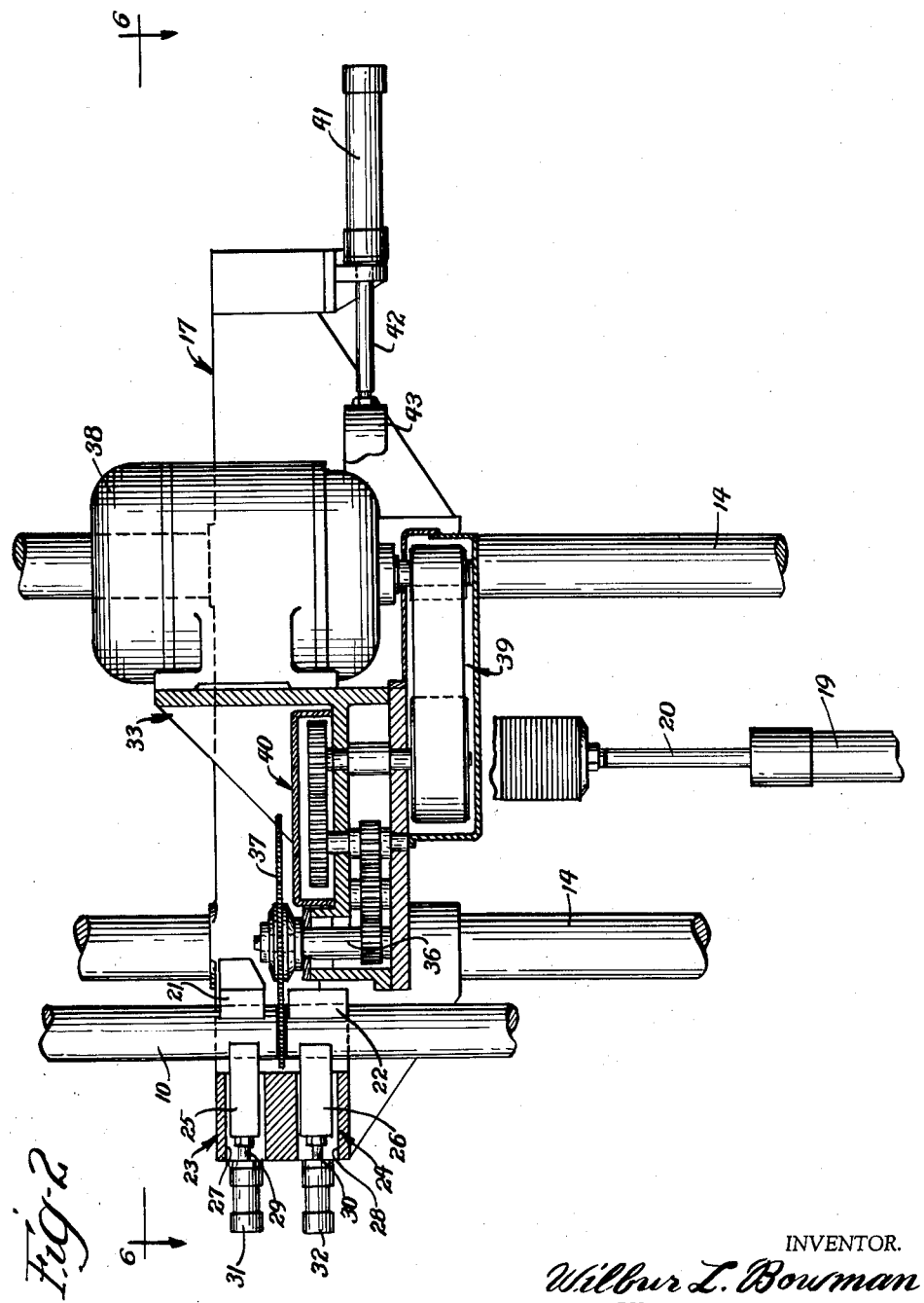

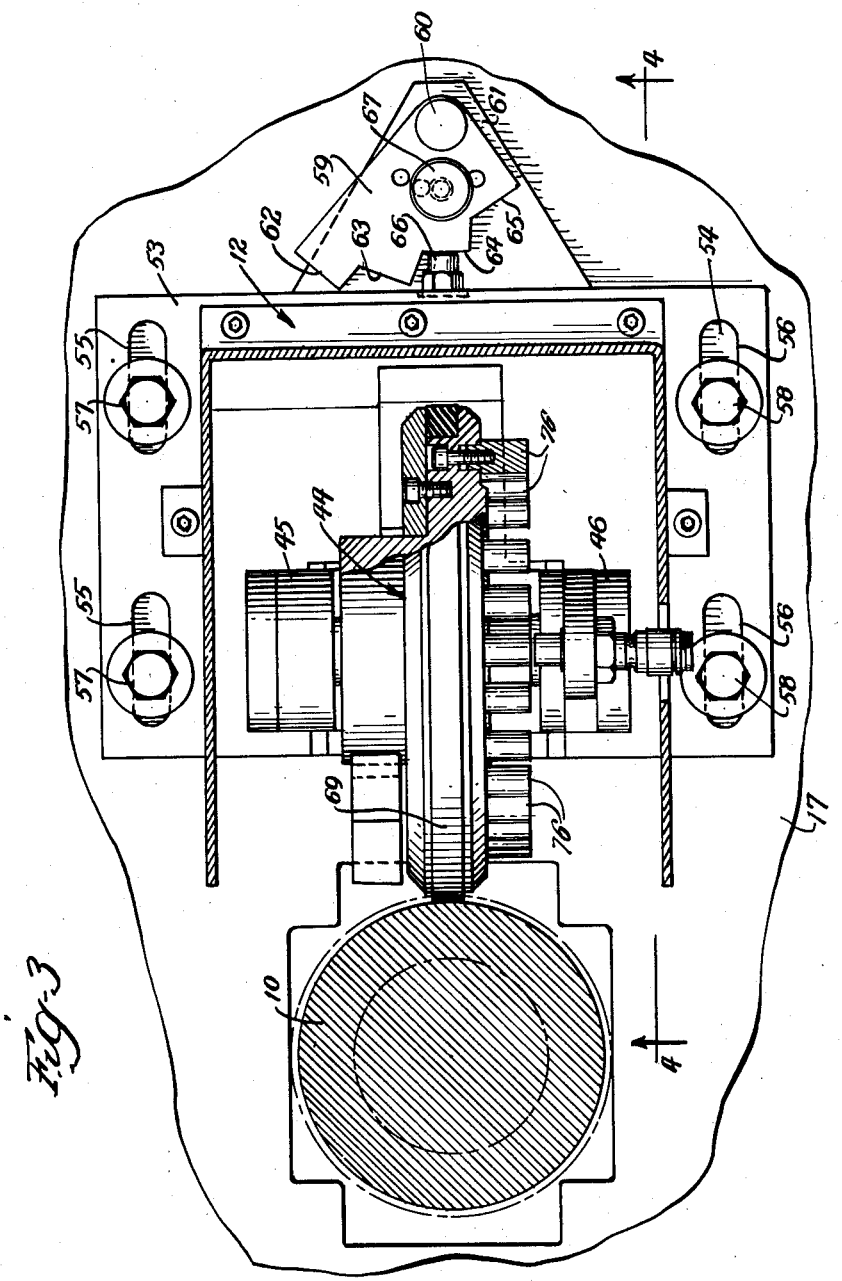

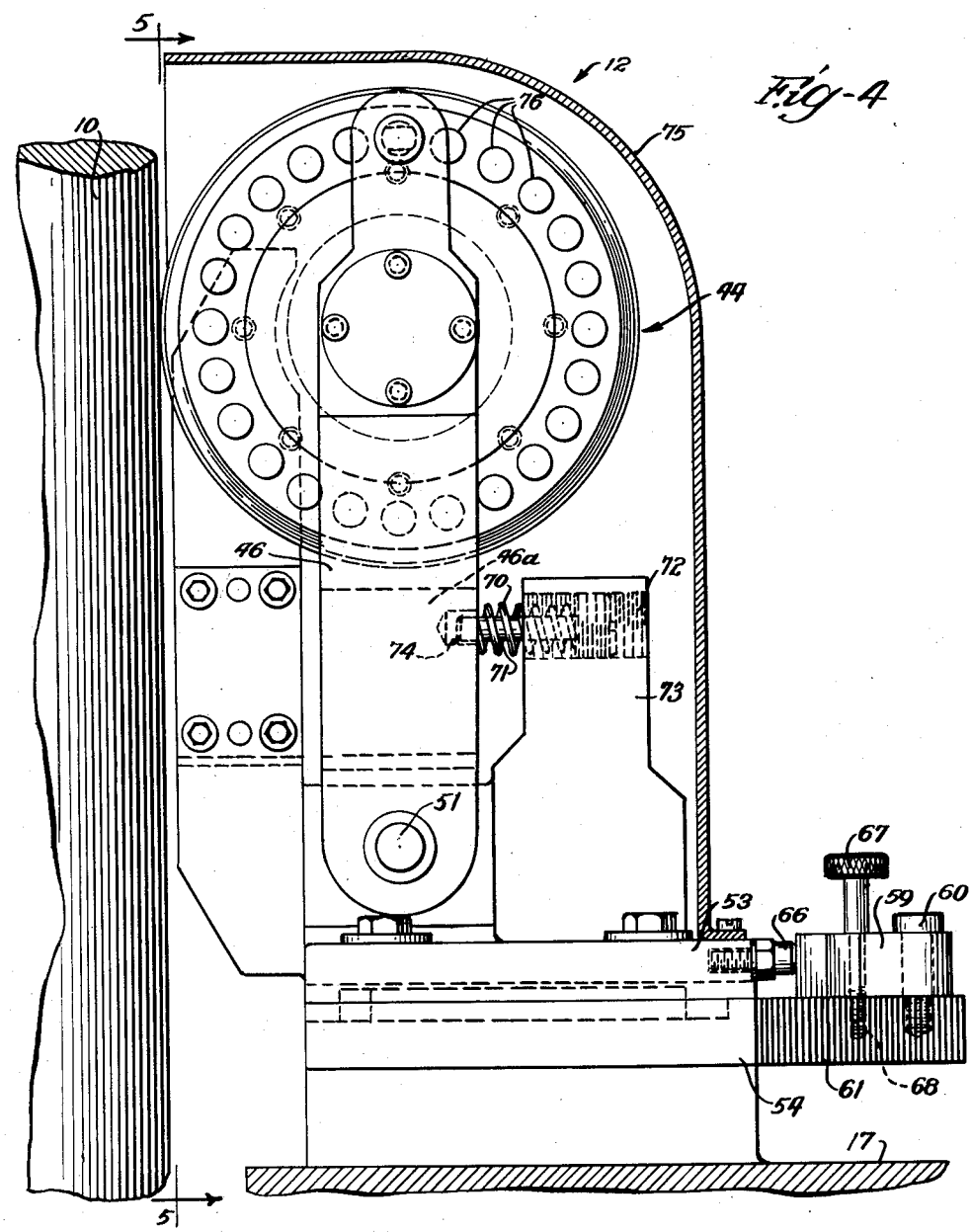

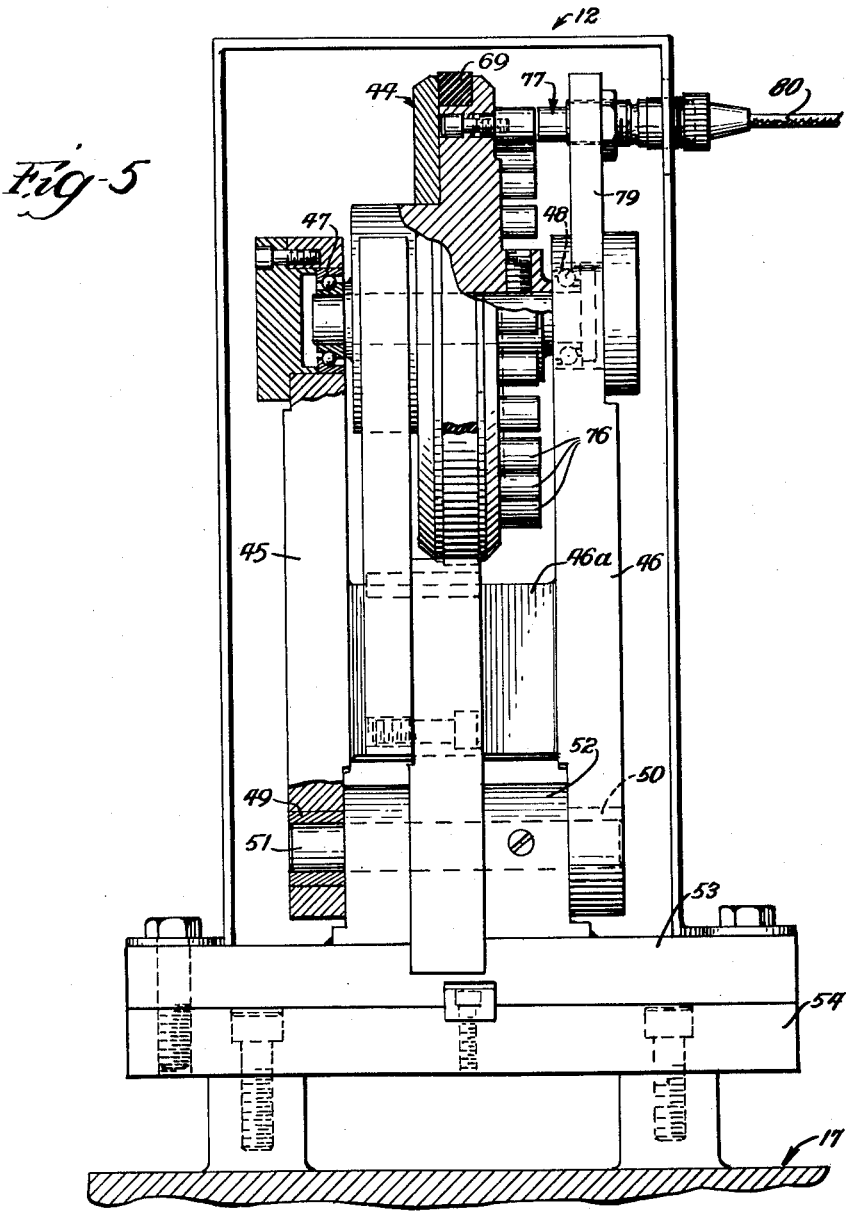

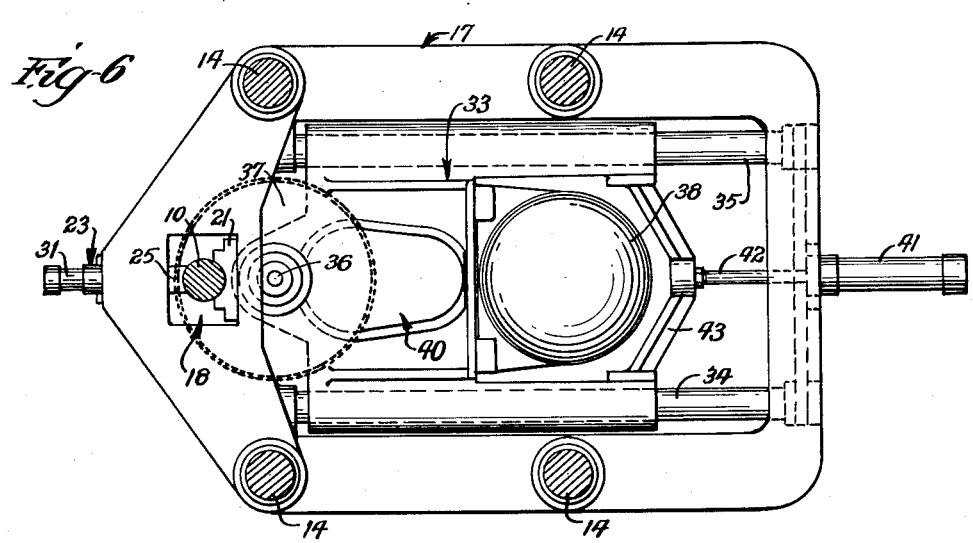
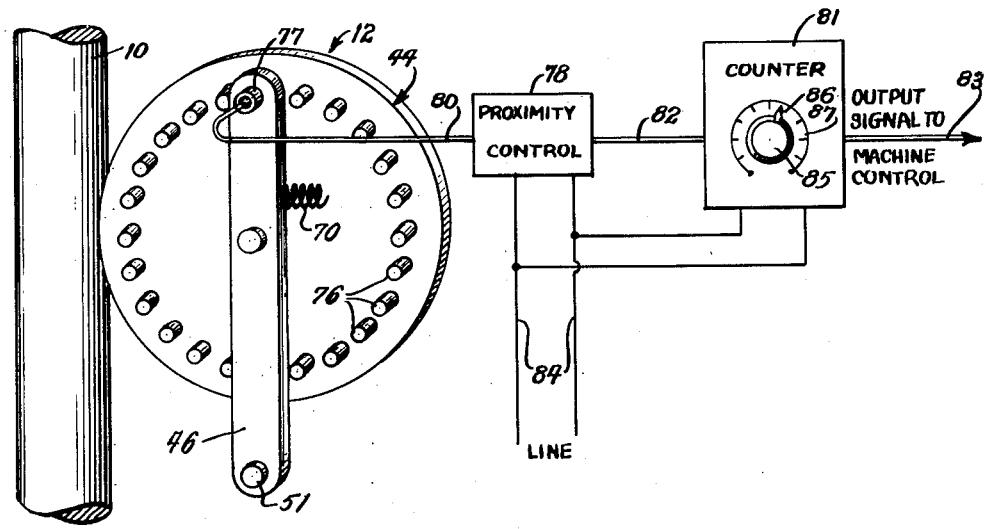

United States Patent Office 3,040,609
Patented June 26, 1962

3,040,609
BILLET SAW MEASURING DEVICE
Wilbur L. Bowman, Polo, Ill., assignor to Odin Corporation, Rockford, Ill., a corporation of Illinois
Filed May 7, 1958, Ser. No. 733,563
4 Claims. (Cl. 83—287)

This invention relates generally to a machine for cutting a moving piece of material into lengths, and more particularly to a machine for measuring and cutting predetermined lengths of billet stock received from a continuous casting process, and still more particularly to means adaptable for use on a machine for cutting a moving piece of material into lengths which accurately measures the lengths of material and which may be readily adjusted for measuring different lengths of material.

Heretofore, machines for cutting pieces of material into lengths have generally used a tripping device arranged in the path of material movement for measuring the length of material to be cut. Adjustment of such a tripping device for varying the length of material to be cut is relatively difficult and involved. Further, the mounting position of such a tripping device on a machine is relatively inflexible and not suitable in many cases.

It is therefore an object of this invention to provide a machine for measuring and cutting a moving piece of material into lengths, which obviates the above difficulties.

The machine of the present invention is particularly useful in cutting a continuously formed bar into predetermined lengths, wherein the bar is roller fed to a movable carriage that is clamped to the bar for movement therewith and which mounts a movable power saw for cutting the bar. An automatic cycle of operation takes place when a measured length of the bar has passed a fixed point of the machine. The length of the bar is measured by a counting wheel which frictionally engages the movable bar and signals a control means for initiating the automatic cycle.

A further object of this invention is to provide a machine for measuring, and then cutting off, predetermined lengths of billet stock from a continuous casting process, wherein the measuring device is highly flexible and may be easily adjusted to measure varying lengths of stock or stock having a different cross section.

A still further object of this invention is in the provision of a billet saw having a counting wheel for measuring successive lengths of moving stock to be cut, wherein electrical means is associated with the counting wheel for transmitting the mechanically measured length into a signal which initiates a cutting cycle.

Another object of this invention resides in the provision of a machine for cutting a moving piece of material into successive lengths, and including a means for measuring the lengths which comprises a counting wheel engaging the moving material and transmitting the length to a control means for initiating a cutting cycle, wherein the counting wheel is essentially an idler wheel and will not be affected by wear.

Still another object of this invention is to provide a machine for measuring and cutting moving stock into predetermined lengths which includes a measuring wheel frictionally engaging the stock, wherein the measuring wheel is adjustably mounted and resiliently biased against the stock.

A further object of this invention is in the provision of a measuring device for measuring moving stocks into lengths which includes a measuring wheel having circumferentially arranged metal pegs which coact with a pickup or transducer, a control means and an electrical counter for counting the increments of travel of the stock past the wheel.

A more complete understanding of the present invention, its mode of operation, and its advantages may be gathered from further reading of this specification, together with an inspection of the accompanying drawings in which:

FIG. 2 is a sectional view, taken along line 2—2 of FIG. 1, showing some parts in section and other parts in elevation and with some parts broken away;

FIG. 3 is a top plan view of the counting wheel of the present invention and illustrated in association with a moving billet;

FIG. 4 is a side elevational view of the counting wheel, and taken substantially along line 4—4 of FIG. 3;

FIG. 5 is a front elevational view of the counting wheel, and taken substantially along line 5—5 of FIG. 4;

FIG. 6 is a top plan view of the vertically movable carriage, taken substantially along line 6—6 of FIG. 2 and being slightly reduced;

FIG. 7 is a diagrammatic view of the counting wheel and the proximity pickup system and the electrical counter.

Figure 1:
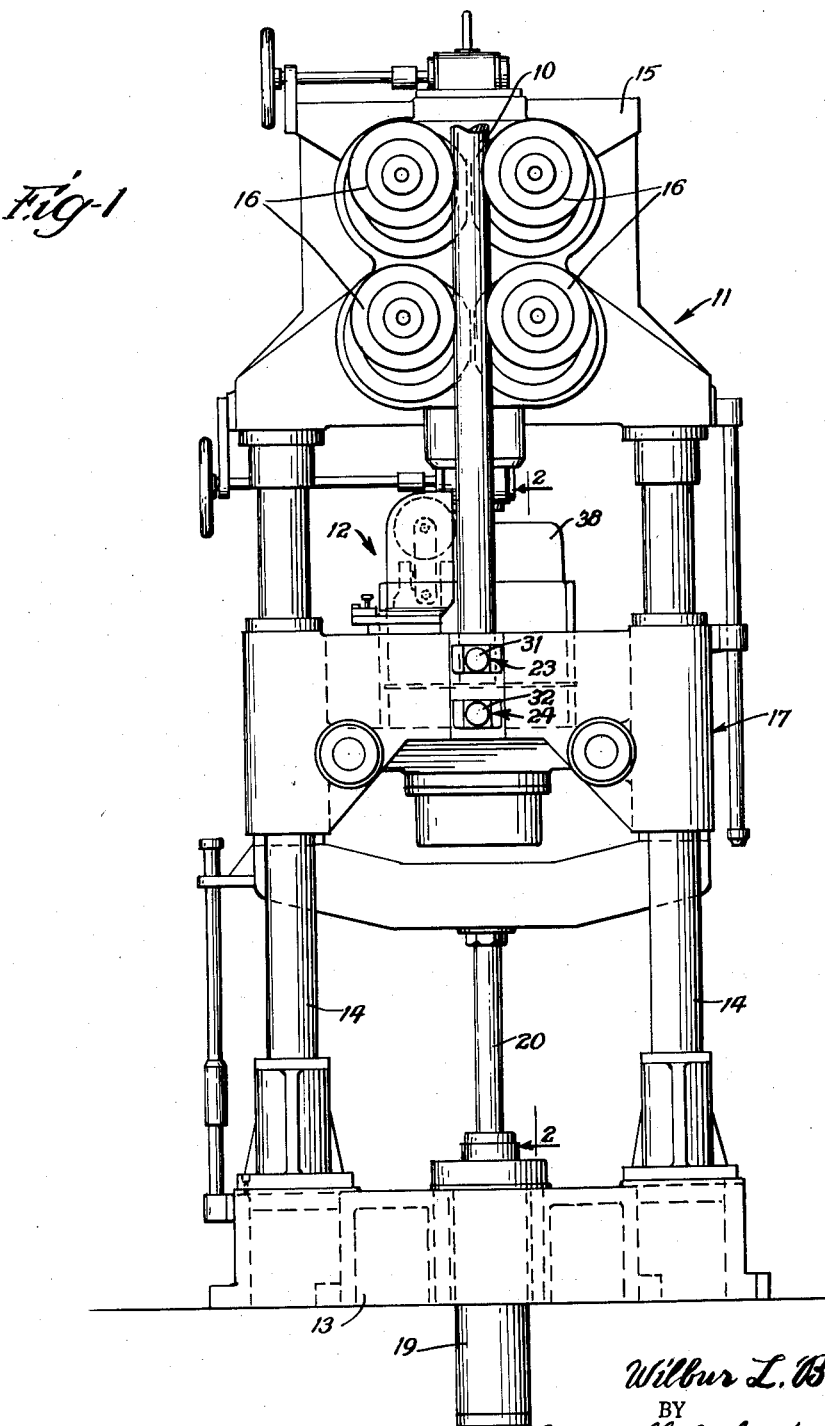
FIG. 1 is a front elevational view of a machine for measuring and cutting moving stock into predetermined lengths, which embodies the present invention.

Referring now to the drawings, a machine for cutting moving billet stock 10 into lengths is generally indicated by the numeral 11 in FIG. 1 and deemed a "billet saw" for purposes of illustrating the present invention. A measuring device, generally designated by the numeral 12, is mounted on the billet saw 11 and serves to measure lengths of stock from the continuously formed billet 10 as the billet passes through the machine. The billet 10 may be continuously formed from a casting furnace (not shown) by a well-known continuous casting process.

Preferably, the billet saw 11 will be arranged directly below a casting furnace so that the continuously formed billet will be immediately cut into lengths as it leaves the casting furnace. Although the present invention will be illustrated and described as applied to a billet saw, it will be appreciated that other uses and purposes of the measuring device will be apparent to those skilled in the art.

The billet saw 11 includes a base 13 of generally rectangular shape having four vertical posts 14 upstanding from the corners of the base. A housing 15 is mounted at the upper ends of the posts 14 which carries the coacting power driven feed rollers 16. The feed rollers engage opposite sides of the billet 10 and feed the billet downwardly through the machine. The actuating mechanism for the rollers is mounted within the housing 15 including mechanism for adjusting the spacing between coacting opposite rollers and tensioning of the rollers relative to the gripping of the billet 10. A prime mover, such as an electric motor, may be used to power the rollers 16, and the motor may be controlled automatically in any desired manner for advancing the billet at a rate corresponding to the rate of billet formation.

A carriage 17, FIGS. 1, 2 and 6, is slidable vertically along the post 14 and along a rectilinear path parallel to the billet or stock path. An opening 18, FIG. 6, is formed in the carriage 17 for freely receiving the billet or stock 10 as it passes therethrough. Movement of the carriage 17 along the post 14 is controlled by a hydraulic cylinder 19 mounted in the base 13 of the machine and having a piston rod 20 connected to the underside of the carriage.

The carriage 17 carries upper and lower fixed jaws 21 and 22 of upper and lower clamping assemblies or clamps 23 and 24. These fixed jaws extend into the opening 18 as seen in FIG. 6. The clamps also include movable jaws 25 and 26 arranged diametrically opposite the fixed jaws 21 and 22, respectively, and movable in horizontally extending bores 27 and 28. The movable jaws 25 and 26 are respectively connected to piston rods 29 and 30 of hydraulic cylinders 31 and 32, FIG. 2. While the jaws of the clamps illustrated are shaped to engage a cylindrical billet, it will be appreciated that jaws of different configuration for gripping a polygonal cross section billet or the like may also be employed. Actuation of the cylinders 31 and 32 for clamping of the billet or stock, effectively connects the stock to the carriage 17. Although the cylinder 19 is used to elevate the carriage 17 on the posts 14, once the clamps 23 and 24 have connected the billet to the carriage, the hydraulic pressure is released in the cylinder 19 and the feed of the billet 10 is allowed to move the carriage 17 downwardly at the rate of feed against an oil cushion set up in the cylinder 19.

A saw head 33, FIGS. 2 and 6, is slidably mounted on a pair of parallel spaced horizontally extending rods 34 and 35 rigidly carried by the carriage 17. A vertical shaft 36 is bearingly mounted on the saw head 33 and has a circular saw 37 secured to the upper end thereof and extending in a horizontal plane arranged between the upper and lower jaws of the clamps 23 and 24 as seen most clearly in FIG. 2. The saw 37 is driven by an electric motor 38 mounted on the saw head 33. The motor 38 is drivingly connected to the saw shaft 36 through a belt and pulley reduction assembly 39 and a gear reduction assembly 40. The saw head 33 is traversed along the rods 34 and 35 by a fluid cylinder 41 having a piston rod 42 connected to the saw head through a yoke structure 43, FIGS. 2 and 6. The cylinder 41 is mounted on the carriage 17. After the clamps have connected the moving billet 10 to the carriage 17, the cylinder 41 is actuated to advance the saw 37 and cut the billet 10. After the cutting action has been completed, the cylinder 41 then retracts the saw head 33 and saw 37, and the clamps 23 and 24 are then released. Subsequently, the carriage 17 is elevated upwardly to its original position.

The measuring device 12 includes a counting wheel 44, FIGS. 3, 4, 5 and 7, rotatably mounted in a pair of upstanding parallel spaced bars 45 and 46 by means of bearings 47 and 48, FIG. 5. The bars 45 and 46 are rigidly connected together adjacent their lower ends by means of a cross member 46a, FIG. 5. Aligned apertures receiving sleeve bearings 49 and 50 at the lower ends of the bars 45 and 46 provide a pivotal mounting for the bars and counting wheel, wherein a pin 51 is bearingly received by the bearings 49 and 50 and carried in an upstanding boss 52. The boss 52 is rigidly secured on top of a horizontally extending movable mounting plate 53, which is adjustably secured to a plate 54 fixed to the vertically movable carriage 17, FIG. 5.

As seen more clearly in FIG. 3, slots 55 and 56 are provided in the movable plate 53 through which bolts 57 and 58 are received and secured to the fixed plate 54. Adjusting of the counting wheel for varying standard billet sizes is facilitated by the adjusting plate 59 pivotally mounted at 60 on a rearwardly extending portion 61 of the fixed plate 54. A plurality of abutment surfaces 62, 63, 64, and 65 extend transversely to a radius drawn from the pivot center of the plate 59 and provide stepped surfaces for engaging an abutment 66 extending rearwardly from the movable mounting plate 53. A pin 67 is carried by the plate 59 and engages one of the several apertures or sockets 68 formed along an arcuate path in the projection 61, FIGS. 3 and 4.

The counting wheel 44 is provided with a relatively hard neoprene rubber ring 69 around its circumference which frictionally engages the billet 10, FIGS. 3 and 5. A rubber ring of 75 durometer hardness has been found satisfactory, although it will be appreciated that other hardnesses may be employed.

The outer surface of the counting wheel rubber ring 69 is resiliently biased against the billet 10 by a coil spring 70, FIG. 4, having one end abutting against the cross member 46a and the other end abutting against the inner face of a set screw 71 threadedly received within a threaded bore 72 of an upstanding stationary member 73 carried on the movable plate 53. A blind hole 74, FIG. 4, is provided in the cross member 46a to freely receive the free end of the set screw 71. By adjusting the set screw 71, the pressure of the counting wheel 44 against the billet 10 may be varied. This pressure is adjusted to be light, but heavy enough to give proper frictional contact between the counting wheel and the billet.

A hood or protective casing 75 is fixed to the movable plate 53 for protecting the counting wheel and associated structure, while being open at its forward end where the wheel engages the movable billet 10.

The counting wheel 44 has mounted on one face thereof a plurality of equally spaced, circumferentially arranged metal pegs 76. The space between adjacent pegs 76 corresponds to a predetermined dimension on the circumferential face of the rubber ring, whereby the distance equals an incremental dimension of the billet 10. For example, twenty-four pegs 76 are arranged on the herein illustrated counting wheel, each of which represents one inch of movement of the counting wheel 44, whereby one revolution of the counting wheel caused by the moving billet will equal twenty-four inches of the billet 10 having passed thereby.

The counting of the passage of metal pegs past a fixed point is accomplished by a proximity pickup system which includes a proximity pickup or transducer 77 and a proximity control unit 78, FIG. 7. The output of the transducer 77 is fed to the proximity control unit. The passage of a metal peg past the pickup 77, which is mounted on an upstanding member 79 carried by the bar 46, FIG. 5, is carried to the proximity control 78 through a cable 80. Electrical impulses generated by the proximity control unit 78 are fed to a counter 81 through a cable 82 which signals the machine control through a line 83 when a predetermined number of impulses have been counted.

The detailed construction and operation of the pickup 77 and proximity control unit 78 do not form a part of the present invention by themselves. A satisfactory type of proximity pickup is manufactured by the Electro Products Laboratories of Chicago, Illinois, and designated as Model 4910–WPL, while a satisfactory type of control unit, made by the same company, is designated as Model 4901–RAC. Also, a counter suitable for use with the control unit is manufactured by Automatic Timing and Controls, Inc. of King of Prussia, Pennsylvania, and designated as Type 2886 Impulse Counter.

Electric power is supplied to the proximity control unit 78 and the counter 81 through power lines 84, FIG. 7.

The counter 81 may be easily adjusted to detect varying numbers of impulses and lengths of billet to be cut by operation of the adjusting knob 85, FIG. 7. The knob 85 has a pointer 86 thereon for coaction with the graduated dial 87 for indicating the number of increments of billet movement desired, or the length of billet to be cut. If it is desired to cut the billet 10 into forty-inch lengths, the knob 85 is rotated until its pointer 86 aligns with the numeral 40 on the dial 87; or if it is desired to cut billets into lengths of sixty inches, the adjusting knob 85 is rotated until its pointer 86 aligns with the number 60 on the dial 87. Thus, it is an easy matter to adjust the machine for cutting off billets of different lengths.

After a count has been made by the counter 81 corresponding to the dialed number, a signal is generated for operating the machine controls whereby the machine is sent through an automatic cycle for cutting the billet. This cycle of operation includes clamping the billet 10 to the vertically movable carriage 17 by means of the clamps 23 and 24, releasing the hydraulic pressure in the carriage cylinder 19 so that the billet will carry the carriage downwardly, advancing the saw head 33 to saw the billet, return of the saw head 33, and return of the carriage 17 to its upper position after releasing of the clamps. Inasmuch as the hydraulic and electrical circuits for accomplishing this automatic cycle of operation are old and well known and do not form a part of the present invention, there is no need for a specific description of the circuits in this application.

It may be seen in FIG. 5 that the outer end of the proximity pickup 77 is slightly spaced from a plane extending through the outer surfaces of the pegs 76. Since no mechanical power is taken from the counting wheel 44, this wheel essentially acts as an idler wheel and will not be affected by wear. Accordingly, a measuring device is provided which is durable and extremely long-lived, and which performs a delicate and precise measuring operation. Further, the measuring device of the present invention provides maximum flexibility and effortless ease of adjustment. The counter 81 is reset automatically at the completion of a sawing cycle, so that completion of the severing of the billet resets the counter whereby further upward movement of the carriage 17 initiates measuring of the next successive billet to be cut.

It will be understood that modifications and variations may be effected without departing from the scope of the novel concepts of the present invention, but it is understood that this application is to be limited only by the scope of the appended claims.

The invention is hereby claimed as follows:

1. A machine for cutting predetermined lengths of stock from a continuously moving stock which comprises, a frame, a carriage movable on said frame in the direction along the line of stock movement, a power operated cutter carried by said carriage and movable thereon along a rectilinear path normal to carriage movement, clamps on said carriage positioned to grip the stock securely thereto, and means for measuring a predetermined length of stock to initiate a cutting cycle including actuation of said clamps to grip the stock, movement of said carriage and advancing of said cutter, said measuring means including a counting wheel freely rotatably mounted on said carriage having its circumference in engagement with said stock, said counting wheel having a plurality of equally spaced incremental pegs on one side thereof, and electrical means mounted adjacent said counting wheel detecting the rotational movement thereof by the number of pegs passing thereby to initiate said cutting cycle.

2. A machine for successively measuring and cutting predetermined lengths of stock from continuous stock moving continuously along a rectilinear path including a frame, a carriage movable on said frame along a path parallel to the stock path, a power operated cutter carried by said carriage and movable thereon along a rectilinear path normal to the stock and carriage paths, clamps on said carriage for gripping the stock and effectively connecting the stock to the carriage, means for measuring a predetermined length of stock, and control means responsive to said measuring means for initiating a cutting cycle including application of the clamps to the stock, movement of the carriage with the stock and advancing the cutter towards the stock, said measuring means comprising, a counting wheel freely rotatably mounted on said carriage and having its circumferential edge in frictional engagement with said stock, a plurality of equally spaced metal pegs circumferentially arranged on one side of said wheel, and means responsive to the passage of a predetermined number of pegs past a fixed point for actuating said control means.

3. A machine for successively measuring and cutting predetermined lengths of stock from continuous stock moving continuously along a rectilinear path including, a frame, a carriage movable on said frame along a path parallel to the stock path, a power operated cutter carried by said carriage and movable thereon along a rectilinear path normal to the stock and carriage paths, clamps on said carriage for gripping the stock and effectively connecting the stock to the carriage, means for measuring a predetermined length of stock, and control means responsive to said measuring means for initiating a cutting cycle including application of the clamps to the stock, movement of the carriage with the stock and advancing the cutter towards the stock, said measuring means comprising, a freely rotatable counting wheel adjustably mounted on said carriage, means for biasing the circumferential edge of said wheel into frictional engagement with said stock, a plurality of equally spaced circumferentially arranged metal pegs mounted on one side of said wheel concentrically spaced inwardly from the circumferential edge of said wheel, and means responsive to the passage of a predetermined number of pegs past a fixed point for actuating said control means.

4. A machine for successively measuring and cutting predetermined lengths of stock from continuous stock moving continuously along a rectilinear path including, a frame, a carriage movable on said frame along a path parallel to the stock path, a power operated cutter carried by said carriage and movable thereon along a rectilinear path normal to the stock and carriage paths, clamps on said carriage for gripping the stock and effectively connecting the stock to the carriage, means for measuring a predetermined length of stock, and control means responsive to said measuring means for initiating a cutting cycle including application of the clamps to the stock, movement of the carriage with the stock and advancing the cutter towards the stock, said measuring means comprising, a counting wheel, bracket means for freely rotatably mounting said wheel adjacent to said stock path, means for adjustably securing said bracket means to said carriage, means for resiliently biasing the circumferentially edge of said wheel into frictional engagement with said stock, a plurality of equally spaced circumferentially arranged metal pegs mounted on one side of said wheel concentrically spaced inwardly from the circumferential edge of said wheel, and means responsive to the passage of a predetermined number of pegs past a fixed point for actuating said control means.

References Cited in the file of this patent

UNITED STATES PATENTS

| | | |
|---|---|---|
| 1,567,919 | Cumfer | Dec. 29, 1925 |
| 1,800,005 | Braun | Apr. 7, 1931 |
| 2,019,465 | Rubin | Oct. 29, 1935 |
| 2,713,139 | Steinthal | July 12, 1955 |
| 2,735,055 | Thomas | Feb. 14, 1956 |
| 2,763,063 | Bandy | Sept. 18, 1956 |
| 2,783,540 | Berry | Mar. 5, 1957 |
| 2,888,626 | Macoy et al. | May 26, 1959 |

FOREIGN PATENTS

| | | |
|---|---|---|
| 16,760 | Great Britain | Aug. 10, 1908 |